US012729703B2

(12) United States Patent
Portoles et al.

(10) Patent No.: US 12,729,703 B2
(45) Date of Patent: Sep. 8, 2026

(54) DEVICE FOR MECHANICAL ATTACHMENT TO THE END OF A TUBE

(71) Applicant: EPSILON COMPOSITE, Gaillan en Medoc (FR)

(72) Inventors: José Portoles, Queyrac (FR); Denis Ferrer, Vertheuil (FR); Maxime Dos Santos, Lesparre-Medoc (FR)

(73) Assignee: EPSILON COMPOSITE, Gaillan en Medoc (FR)

( * ) Notice: Subject to any disclaimer, the term of this patent is extended or adjusted under 35 U.S.C. 154(b) by 480 days.

(21) Appl. No.: 18/256,771

(22) PCT Filed: Dec. 9, 2020

(86) PCT No.: PCT/FR2020/052362

§ 371 (c)(1),
(2) Date: Jun. 9, 2023

(87) PCT Pub. No.: WO2022/123124

PCT Pub. Date: Jun. 16, 2022

(65) Prior Publication Data

US 2024/0026912 A1 Jan. 25, 2024

(51) Int. Cl.
*F16B 7/02* (2006.01)
*B64B 1/08* (2006.01)

(52) U.S. Cl.
CPC ................ *F16B 7/025* (2013.01); *B64B 1/08* (2013.01)

(58) Field of Classification Search
CPC .... B64B 1/08; F16B 7/02; F16B 7/025; F16B 7/149; F16D 1/09; F16D 1/092;
(Continued)

(56) References Cited

U.S. PATENT DOCUMENTS 3,776,651 A * 12/1973 Peter .......................... F16D 1/09
403/370
4,615,640 A * 10/1986 Hosokawa .............. F16D 1/094
403/372
(Continued)

FOREIGN PATENT DOCUMENTS

BE 1009407 A3 3/1997
CH 251206 A 10/1947
(Continued)

OTHER PUBLICATIONS

Foreign Communication from a Related Counterpart Application, International Search Report and Written Opinion dated Aug. 9, 2021, International Application No. PCT/FR2020/052362 filed on Dec. 9, 2020.

*Primary Examiner* — Josh Skroupa
(74) *Attorney, Agent, or Firm* — Conley Rose, P.C.

(57) ABSTRACT

An attachment device includes a conical insert in the form of a truncated cone, an internal ring which is provided with a recess in the form of a truncated cone the diameter of which narrows in the direction of the interior of the tube and the angle of which is equal to the angle of the truncated cone of the conical insert, and an external ring including a cylindrical portion the internal diameter of which is substantially equal to the external diameter of the tube. The external ring includes a shoulder which partially closes an end of the external ring and which has a circular opening. The shoulder includes an annular internal face which is intended to abut the end face of the tube and the transverse end face of the internal ring located at the side of the end of the tube.

14 Claims, 4 Drawing Sheets

(58) Field of Classification Search

CPC .. F16D 1/093; F16D 1/097; F16D 2001/0903; F16D 2001/0945; G09F 7/18; G09F 2007/1804; G09F 2007/1817; Y10T 403/46; Y10T 403/4608; Y10T 403/4637; Y10T 403/4691; Y10T 403/7056; Y10T 403/7058

USPC ................ 403/230, 233, 243, 262, 370, 371

See application file for complete search history.

(56) References Cited

U.S. PATENT DOCUMENTS

| | | | | | |
|---|---|---|---|---|---|
| 4,715,739 | A * | 12/1987 | Ruegg | F16C 3/026 403/373 |
| 9,328,749 | B2 * | 5/2016 | Brunneke | F16B 7/182 |
| 2019/0234443 | A1 * | 8/2019 | Man | F16B 7/02 |

FOREIGN PATENT DOCUMENTS

| | | | | |
|---|---|---|---|---|
| CN | 104879350 | A | 9/2015 | |
| DE | 660546 | C | 5/1938 | |
| DE | 29505791 | U1 | 6/1995 | |
| DE | 29614242 | U1 * | 11/1996 | F16D 2001/0903 |
| EP | 0477707 | A1 * | 4/1992 | F16B 7/025 |
| EP | 0564889 | A1 * | 10/1993 | F16B 7/025 |
| FR | 2318333 | A1 * | 2/1977 | F16B 7/02 |
| GB | 444087 | A * | 3/1936 | F16B 7/025 |
| IT | 201800020032 | A1 | 6/2020 | |
| WO | WO-2006008488 | A1 * | 1/2006 | F16B 7/025 |
| WO | 2022123124 | A1 | 6/2022 | |

* cited by examiner

DEVICE FOR MECHANICAL ATTACHMENT TO THE END OF A TUBE

CROSS-REFERENCE TO RELATED APPLICATIONS

The present application is a filing under 35 U.S.C. 371 as the National Stage of International Application No. PCT/FR2020/052362, filed Dec. 9, 2020, entitled "DEVICE FOR MECHANICAL ATTACHMENT TO THE END OF A TUBE," which is incorporated herein by reference in its entirety for all purposes.

The present invention relates to the technical field of attachment devices anchored to the ends of a tube and intended to create a mechanical connection between the tube and a structure and relates in particular to a mechanical attachment device at the end of a tube.

STATE OF THE ART

For the purpose of manufacturing a light and resistant structure, in the aeronautical field, such as for example a dirigible, tubes are used and in particular tubes or cylindrical rods made of composite material particularly resistant to mechanical traction, compression or bending forces. The use of such tubes requires devices to be provided at their end to enable them to be mechanically fastened to another part of the structure. Attachment devices such as anchoring or connecting devices located at the ends of a tube comprise threaded sleeves in which the also-threaded ends of the tube are inserted. These devices are generally difficult to implement and require preparation of the end of the tube in which they are inserted.

Other attachment devices located at the ends of a tube are composed of components assembled by gluing.

This is the case of the device described in DE10200402144 wherein the end of a composite cylindrical rod comprises an internal conical thread element and a conical sleeve located between the wall of the rod and the conical element. The circumferential stiffness of the cylindrical rod is increased by virtue of an annular fiber winding. The conical sleeve is bonded to the rod over its entire length. This device makes it possible to withstand significant forces on the rod. However, once put into place and bonded, this device, which is difficult to dismantle, does not facilitate the repair or reuse of the components or their end-of-life recycling. Furthermore, the resistance performance of a bonded assembly requires extremely strict implementation and is tracked to guarantee its reproducibility. Furthermore, the mechanical control of a bonded assembly has the disadvantage of being destructive or of introducing uncertainty regarding the future resistance of the assembly.

DESCRIPTION OF THE INVENTION

This is why the purpose of the invention is to overcome the aforementioned drawbacks by providing a device for attaching to the end of a tube enabling simple mounting and removal of the components making up the device while guaranteeing a strong and reproducible mechanical anchoring.

Another object of the invention is to provide a method for joining the attachment device.

The object of the invention is therefore an attachment device obtained by the assembly of three components at the end of a tube, comprising:

- a conical insert in the form of a truncated cone, the diameter of which narrows in the direction of the end of the tube, the conical insert having an element for receiving a gripping or attachment member,
- an internal ring provided with a recess in the form of a truncated cone, the diameter of which narrows in the direction of the center of the tube and the angle of which is equal to or slightly less than the angle of the truncated cone of the conical insert, the external wall of the internal ring being mainly cylindrical with a diameter substantially equal to the internal diameter of the tube, the insert being located in the recess of the internal ring.

According to the main features of the invention, the attachment device comprises an external ring comprising a cylindrical portion, the internal diameter of which is substantially equal to the external diameter of the tube, the internal wall of the cylindrical portion of the external ring being intended to come into contact with the cylindrical external wall of the tube, the external ring comprising a shoulder that partially closes an end of the external ring and that has a circular opening, the shoulder comprising an annular internal face that is intended to abut the end face of the tube and the transverse end face of the internal ring located at the side of the end of the tube.

A second object of the invention is a method for joining three components to the end of a tube to obtain the attachment device according to one of claims 1 to 12, comprising the steps according to which:

- The conical insert is fitted into the recess of the internal ring so as to cause its smaller-diameter face to penetrate through the face of the internal ring corresponding to its end face where the recess is of greater diameter until the conical insert is immobilized by contact,
- The internal ring provided with the conical insert is placed in the tube by being pushed inside until the end face of the internal ring is in the same plane as the end face of the tube, the external wall of the internal ring being cylindrical with a diameter substantially equal to the internal diameter of the tube or slightly smaller, the external cylindrical wall of the internal ring is then positioned in contact against the internal wall of the tube,
- The external ring is placed around the tube so that the internal wall of its cylindrical portion is in contact with the external wall of the tube and so that the end surface of the tube abuts the annular planar face of the external ring,
- A force is applied to the conical insert in order to move it in the direction of the end of the tube to its assembled position, the conical insert exerting, during its movement, a radial thrust on the wall of the internal ring causing its expansion, the necessary force applied corresponding to the preload of the attachment device will remain in place after assembly.

A third object of the invention is the use in the aeronautical construction of an attachment device as explained above.

BRIEF DESCRIPTION OF THE FIGURES

The purposes, objects and features of the invention will become clearer upon reading the following description made with reference to the drawings wherein.

DETAILED DESCRIPTION OF THE INVENTION

The attachment device according to the invention has two embodiments in which it is respectively non-deformable and deformable. These two embodiments are illustrated specifically in FIGS. 2 to 7. The description applies to both embodiments unless specified otherwise. In the description, the mention of two references separated by an "or" means that it involves the designation of the first embodiment or of the second embodiment.

Figure 1:
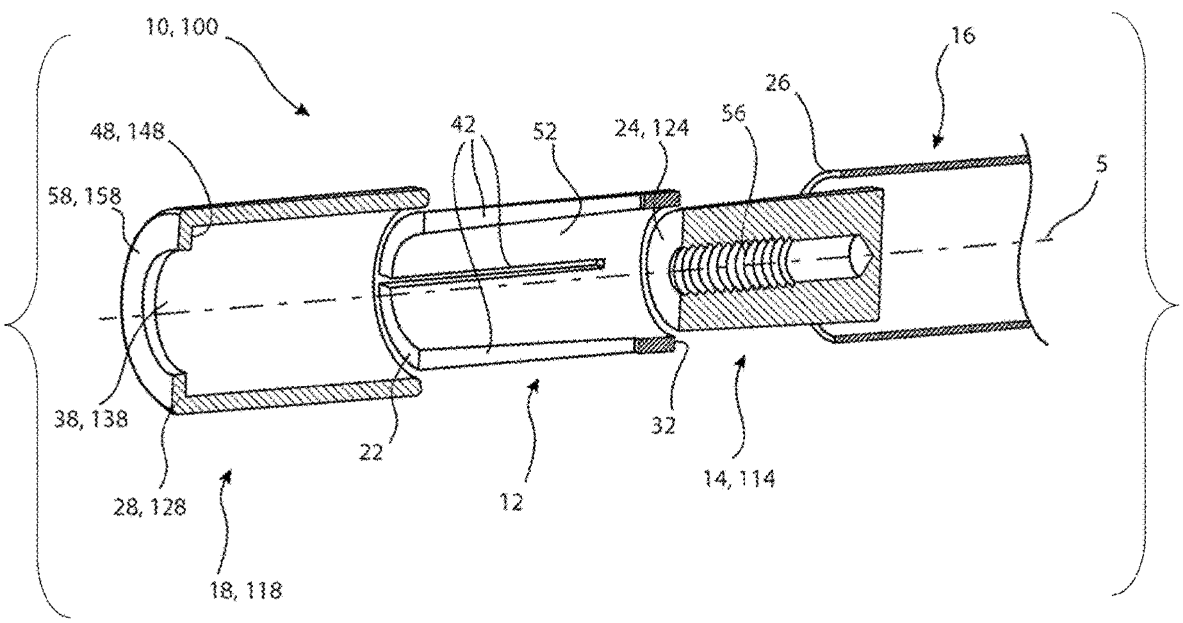
FIG. 1 shows an exploded three-dimensional view of a section of the device according to the invention.

The attachment device 10 or 100 according to the invention is shown in an exploded perspective view in cross section in FIG. 1. The end of a tube 16 with a longitudinal axis 5 and its planar end face 26 are also shown in cross section. The attachment device 10 or 100 mainly comprises three components intended to be assembled at the end of the tube 16: an internal ring 12, a conical insert 14 or 114 and an external ring 18 or 118. The three components and the tube have the same longitudinal axis shown by the axis 5 in the figures. The internal ring 12 has an external cylindrical wall with a diameter equal to or substantially equal to the internal diameter of the tube 16 or slightly less and a frustoconical internal wall. The internal ring 12 comprises a recess 52 in the form of a truncated cone passing through one end of the internal ring to the other and a slot or a plurality of slots 42. The internal ring is oriented relative to the tube so that the diameter of its recess 52 in the form of a truncated cone narrows in the direction of the end of the tube. The slots 42 are formed along the generatrices of the internal ring 12 and their plane passes through the longitudinal axis 5 of the internal ring. They are preferably distributed equidistantly around the circumference of the internal ring. As can be seen in FIG. 1, the slots 42 extend longitudinally over a portion of the length of the internal ring 12. The number of slots 42 of the internal ring 12 depends on its diameter. According to the preferred embodiment of the invention and in particular for an external diameter of the internal ring 12 around 40 mm, the number of slots 42 is four. The number of slots may be between one and twelve without going beyond the scope of the invention.

The internal ring 12 comprises two transverse end faces oriented in planes transverse to the longitudinal axis 5. A first end face 22 oriented in the same direction as the end face 26 of the tube 16 and a second transverse end face 32. The second transverse end face 32 of the internal ring 12 corresponding to its end face where the recess 52 is of greater diameter.

The attachment device 10 or 100 comprises an external ring 18 or 118. The external ring 18 or 118 mainly comprises a hollow cylindrical body and a shoulder 28 or 128 in the form of an annular ring that partially closes one end of the ring and that has a circular opening 38 or 138. The shoulder 28 or 128 has an internal face 48 or 148 located inside and at the end of the external ring 18 or 118 and an external face 58 or 158 located on the outside and at the end of the external ring, the faces 48 or 148 and 58 or 158 being planar and annular.

The attachment device according to the invention also comprises a conical insert 14 or 114 in the form of a truncated cone, the diameter of which narrows in the direction of the end of the tube 16. The conical insert has a receiving element 56 for a gripping or attachment member. In the described embodiments, the receiving element is a threaded central hole. However, the conical insert could comprise a receiving element in the form of a male portion without departing from the scope of the invention. The recess 52 in the form of a truncated cone has an angle equal to or up to 1 degree less than the angle of the truncated cone so that the slope of the frustoconical wall turned toward the outside of the conical insert 14 or 114 coincides with the slope of the frustoconical wall turned toward the inside of the internal ring 12. This feature enables the two walls to come into intimate contact when the conical insert 14 or 114 is fitted into the internal ring 12. The conical insert 14 or 114 comprises two transverse end faces oriented in planes transverse to the longitudinal axis 5. These two transverse end faces are planar and circular. The first transverse face 24 or 124 is the one corresponding to the smallest diameter of the conical insert, it is placed on the side of the end of the tube 16, while the second, greater-diameter transverse face of the conical insert is placed on the side of the interior of the tube 16.

To install the attachment device 10 or 100 according to the invention, the assembly of the components should be carried out according to the following steps:

- The conical insert 14 or 114 is fitted into the recess 52 of the internal ring 12 so as to cause its first smaller-diameter face 24 or 124 to penetrate through the face 32 of the internal ring corresponding to its end face where the recess is of greater diameter until the conical insert is immobilized by contact with the internal ring,
- The internal ring 12 provided with the conical insert 14 or 114 is placed in the tube 16 by being pushed inside until the end face 22 of the internal ring is in the same plane as the end face 26 of the tube 16. Since the external wall of the internal ring 12 is cylindrical with a diameter substantially equal to the internal diameter of the tube 16 or slightly smaller, the external cylindrical wall of the internal ring 12 is then located in contact against the internal wall of the tube 16.
- The external ring 18 or 118 is placed around the tube 16 so that the internal wall of its cylindrical portion is in contact with the external wall of the tube 16 and so that the end surface 26 of the tube 16 abuts the annular planar face 48 or 148 of the external ring 18 or 118,
- A force is applied to the conical insert in order to move it in the direction of the end of the tube to its assembled position corresponding to its operational or working position, the conical insert exerting, during its movement, a radial thrust on the wall of the internal ring causing its expansion, the necessary force applied corresponding to the preload of the attachment device will remain in place after assembly. The preload also corresponding to the limit tensile load for which the device 10 or 100 has been sized. During the last step, the receiving element 56 of the conical insert is used to move it using a gripping member such as a tool or a bolt that is screwed into the threaded hole, for example, and on which tension is applied while a force of opposite direction sufficient to keep the attachment device 10 or 100 fixed is applied on the shoulder 28 or 128. When the conical insert 14 or 114 is pulled to its assembled position, the external surface of the conical insert slides on the internal side wall of the internal ring 12, which tends to push it outwards and that leads to the expansion of the internal ring owing to the enlargement of the slots 42 and thus the preload is put in place by elastic deformation of the internal ring.

The external ring 18 or 118 makes it possible to confine the tube so that it supports the expansion of the internal ring without cracking. Once the components are assembled on the tube, the attachment device according to the invention clamps the tube 16 between the expandable internal ring 12 and the external ring 18 or 118. The expansion of the internal ring 12 frictionally secures the three components 12, 14 or 114, 18 or 118 and the tube 16. The conical insert applies a radial and transverse pressure to the internal ring, this pressure is also transmitted to the tube, the external wall of the internal ring is firmly applied to the internal wall of the tube and the attachment device is blocked. As soon as the conical insert is pushed back toward the interior of the tube 16, the pressure is released and the different components can be disassembled according to a disassembly method that implements the steps of the assembly method in the reverse direction.

When the different components of the device are assembled at the end of the tube 16, the attachment device 10 or 100 exerts a transverse pressure on the internal and external walls of the tube 16 so that the device is held clamped on the tube, the conical insert 14 or 114 is then wedged in the internal ring 12 in its assembled position and the attachment device is ready to receive and withstand external mechanical forces. In this position, the expansion of the internal ring 12 is due mainly to elastic deformations, which has the advantage of facilitating the disassembly of the device and its possible reuse.

The conical insert 14 or 114 has an angle of less than 7° and preferably is between 1° and 5°. These angles have the advantage of being necessary to enable the assembly of the components and sufficient to hold the components together by friction. The device according to the invention does not include any bonded elements and therefore facilitates the assembly method and limits costs.

Figure 2:
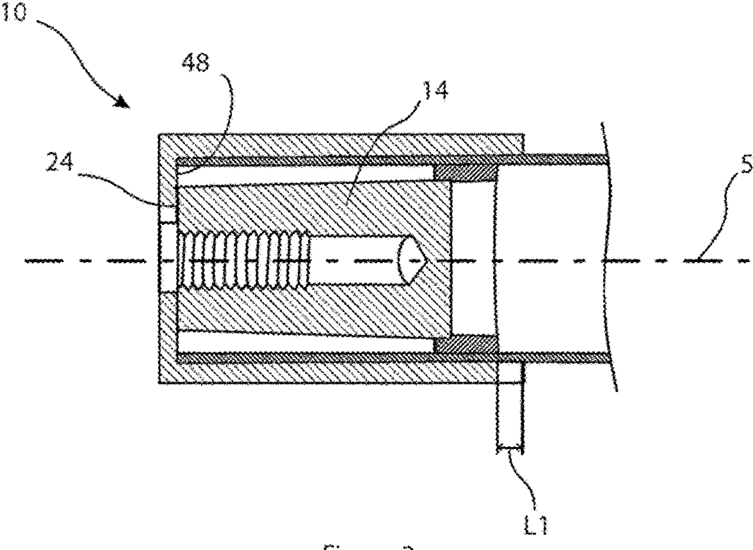
FIG. 2 shows a section of the device according to the invention according to the first embodiment of the invention.
Figure 5:
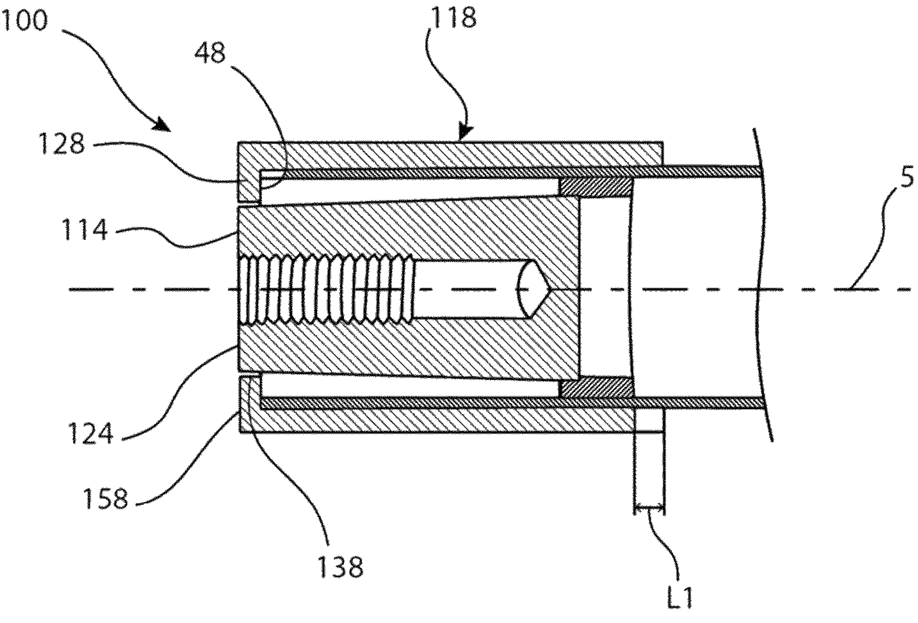
FIG. 5 shows a section of the device according to the invention according to the second embodiment of the invention.

The length of the cylindrical portion of the external ring 18 or 118 is greater than the length of the internal ring 12 so that the length of tube 16 covered by the external ring 18 or 118 is greater than the length of tube 16 covered by the internal ring 12, the lengths being considered along the longitudinal axis 5. This difference in length, denoted L1 in FIGS. 2 and 5, represents between 5% and 15% of the length of tube 16 covered by the internal ring 12. For a difference in length L1 of less than 5%, a phenomenon of stress concentration in the tube section located at the end of the internal ring occurs and may lead to the rupture of the tube. For a difference in length L1 greater than 15%, the external ring part beyond the 15% no longer supports the expansion of the internal ring.

Figure 3:
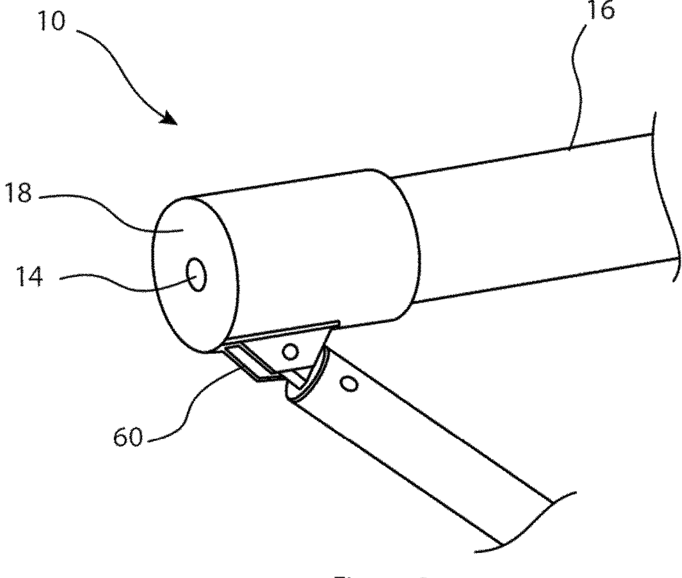
FIG. 3 shows a three-dimensional view of the device according to the invention as a connecting component according to the first embodiment.
Figure 3:
Figure 6:
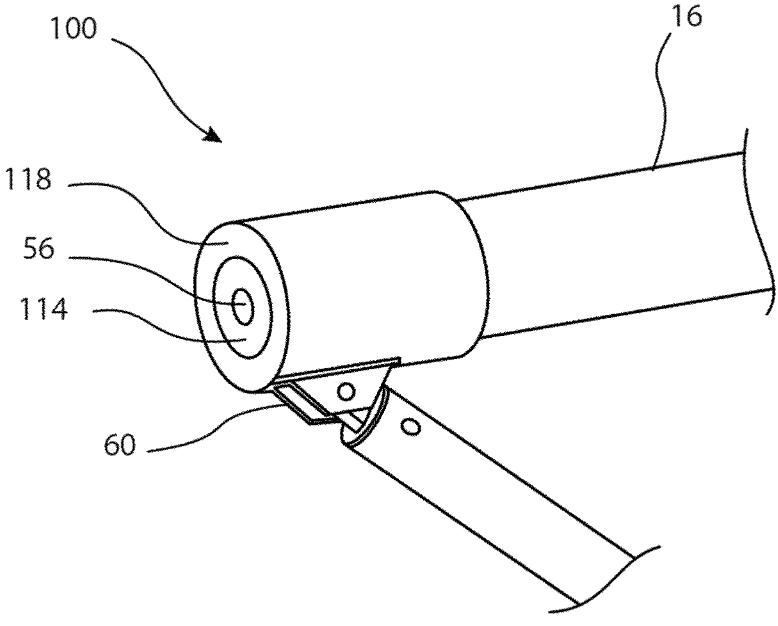
FIG. 6 shows a three-dimensional view of the device according to the invention as a connecting component according to the second embodiment.

The attachment device according to the two embodiments of the invention and the alternatives thereof can serve as a connecting component for attaching the last diagonal of a lattice structure on the external ring 18 and 118 as illustrated in FIGS. 3 and 6 or on the conical insert 14 and 114. According to FIGS. 3 and 6, the attachment device 10 and 100 comprises a flange 60 attached to the external wall of the external ring 18 or 118 in order to connect the device 10 or 100 to the structure made of lattice beams. According to FIGS. 4 and 7, one beam of the lattice structure is directly connected to the attachment device 10 and 100 by means of, for example, a screw 36 screwed onto the receiving element 56 of the conical insert 14 and 114. The structure can also be attached to another part of the device.

The attachment device 10 or 100 can be used in an aeronautical construction, for example in a dirigible. The tube 16 is then one of the main tubes of the end of a lattice beam and the device 10 or 100 thus ensures the connection between the end of the tube 16 and the structure of the dirigible and also ensures the transfer of the forces applied to the elements constituting the structure which can be very mechanically stressed.

This is because, depending on the forces to which the device is subjected in its assembled position at the end of the tube 16, the forces are transmitted to the different components of the device differently. In the case of compression forces, the force is introduced by the external face 58 or 158 of the external ring 18 or 118 that transmits the forces through the external and internal surfaces of the tube 16. In the case of traction force, the force passes through the conical insert 14 or 114 that transmits it by contact to the internal ring 12. The internal ring 12 being in contact with the shoulder 28 or 128 of the external ring 18, the forces also pass through the external and internal surfaces of the tube 16. In the case of the non-deformable embodiment, the torsion forces pass mainly through the surface in contact with the external face 58 of the external ring 18 and then by the surface in transverse contact 24 of the conical insert with the internal face 58 of the external ring 18. In the case of the deformable embodiment, the torsional forces pass mainly through the surface in contact with the transverse face 24 of the conical insert with the face of the beam of the lattice structure. If the application requires significant torsion forces, standard mechanical elements such as keys or pins can be used to connect the conical insert 14 or 114 and the external ring 18 in torsion.

Figure 4:
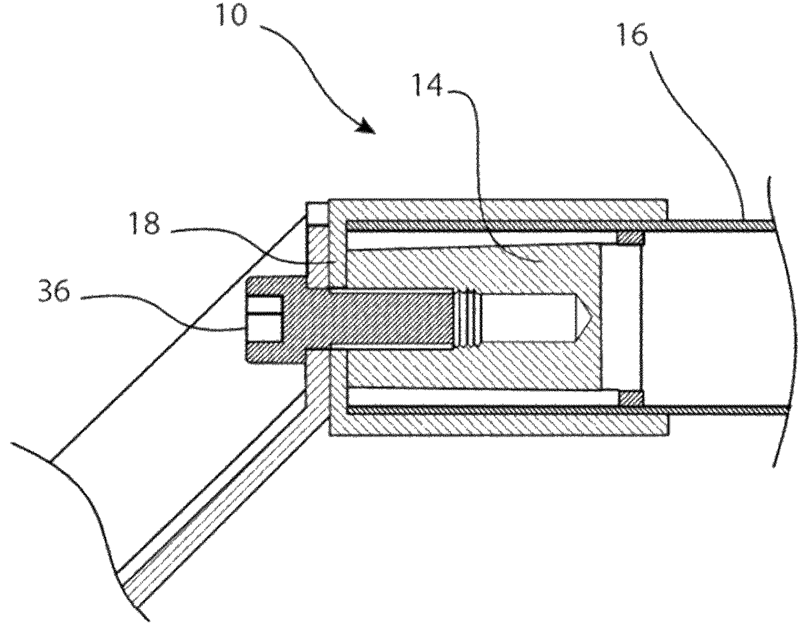
FIG. 4 shows a cross sectional view of the device according to the invention as a connecting component according to the first embodiment.
Figure 7:
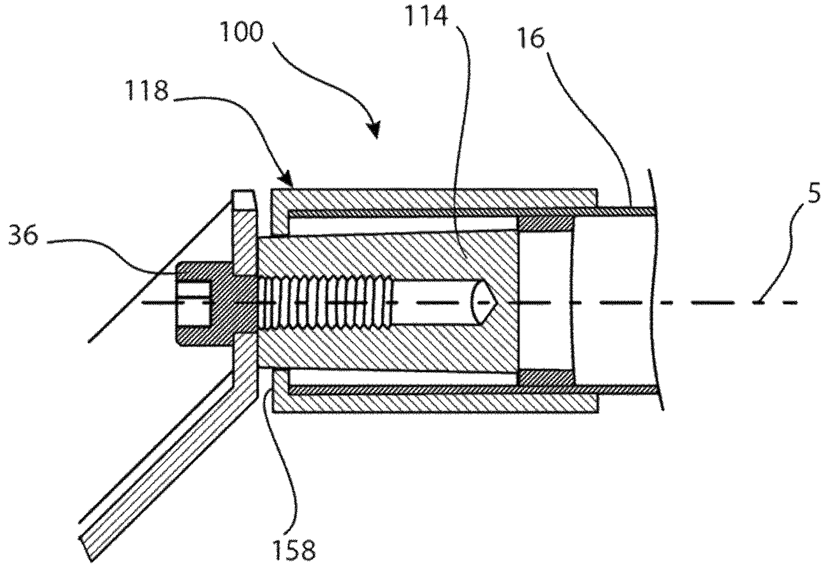
FIG. 7 shows a cross sectional view of the device according to the invention as a connecting component according to the second embodiment.

The attachment device 10 of the first embodiment illustrated in FIGS. 2 to 4 is non-deformable while the attachment device 100 of the second embodiment, illustrated in FIGS. 5 to 7, is deformable. The conical insert and the external ring differ in these two embodiments over some of their size. For the non-deformable attachment device 10, the conical insert and the external ring are referenced 14 and 18 while for the deformable attachment device 100, the conical insert and the external ring are referenced 114 and 118.

According to the first embodiment illustrated in FIG. 2, the conical insert 14 and the external ring are sized so that, in their assembled position with the internal ring 12 on the end of the tube 16, the transverse end face 24 of the conical insert 14 abuts the annular internal face 48 of the external ring 18. The smallest diameter of the conical insert 14 is slightly larger than the smallest internal diameter of the internal ring 12. The difference in diameter is a few tenths of a mm and more precisely this difference in diameter is between one- and nine-tenths of a millimeter. The end face 26 of the tube 16 and the transverse end face 22 of the internal ring also abut the annular internal face 48 of the external ring 18. The width of the shoulder 28 is then arranged so that the circular opening 38 has a sufficient diameter to allow free access to the receiving element 56 of the conical insert 14. According to the embodiments described, the width of the shoulder 28 is therefore arranged so that the circular opening 38 has a diameter greater than the diameter of the threaded central hole 56 of the conical insert 14 and less than the transverse face 24 of the conical insert 14. In this embodiment, the transverse face 24 of the conical insert is in the same plane as the end face 22 of the internal ring 12. In this embodiment, when the device 10 experiences a tensile load greater than the load for which it has been sized, corresponding to the preload, it remains non-deformable until its potential rupture.

According to the second embodiment illustrated in FIG. 5, the conical insert 114 is in its assembled position, its end transverse face 24 does not abut the internal face 148 of the external ring 118. The transverse end face 124 of the conical insert is in the same plane as the external face 158 of the external ring 118. In this embodiment, just like the first embodiment, the end face 26 of the tube 16 and the transverse end face 22 of the internal ring 12 also abut the annular planar face 148 of the external ring 118. The width of the shoulder 128 is then arranged so that the circular opening 138 has a diameter greater than the diameter of the transverse face 124 of the conical insert 114, preferably greater than 0.1 to 2 mm. In this embodiment, the conical insert can move in the longitudinal direction toward the outside of the tube if it is subjected to a load greater than that for which it has been sized, corresponding to the preload. The movement of the conical insert beyond the external ring is a visual overload indicator. Maintenance operators can thus monitor the structure and detect whether it has undergone a higher load than that for which it has been sized.

If, for example, the insert undergoes a tensile force greater than the preload, it moves in the longitudinal direction toward the exterior of the tube as can be seen in FIG. 7 where the transverse surface 124 of the conical insert has exceeded the plane 158 of the external face of the ring 118. In this embodiment, the deformations of the device 100 and in particular the deformations of the internal ring 12 are plastic deformations and will always precede the potential rupture.

The conical inserts 14 and 114 are sized in such a way that when they are in their assembled position, the devices 10 and 100 have an equivalent preload. Preferably, the three components of the device are made of the same material, for example made of metal such as aluminum or an aluminum alloy. In all cases, the transverse thermal expansion coefficient of the three components must be substantially equal in order to limit differential expansions due to the different nature of the materials that could occur and that could dismantle the components. Indeed, temperature gradients may occur ranging from −30° C. to 80° C., or even from −50° C. to 85° C. In order to guarantee the functionality of the device for such temperature ranges, the device according to the invention was tested up to 110° C.

For example, the components may be made of composite material, in particular of composite material with carbon fibers.

Preferably, the length of the slots 42 on the internal ring 12 is less than the length of the conical insert 14 or 114. In addition, the slots extend from the transverse face 22 of the internal ring located on the side of the end of the tube and correspond to the first end of the internal ring, to the vicinity of the other transverse face of the internal ring located at the opposite end of the first, tube side. Therefore, one end of the slots 42 all opens out on the same side on the outside of the ring while the other end is inside the ring. This feature has several advantages. On the one hand, the part of the internal ring not split by the slots 42 has a continuous internal annular surface in contact with the conical insert and a continuous external annular surface in contact with the tube, the continuity of the annular surfaces in contact ensuring the sealing of the device. Furthermore, the non-split annular part of the internal ring expands less than the split part during the assembly step, and makes it possible to attenuate the stresses at the outlet of the device in the tube.

According to an alternative embodiment of the device according to the invention, the internal ring 12 comprises two series of longitudinal slots, each series comprising at least two slots. The slots of the first series extend from the transverse face 22 of the internal ring located on the side of the end of the tube and correspond to the first end of the internal ring to the vicinity of the other transverse face 32 of the internal ring, located at the opposite end of the first, without reaching the latter, while the slots of the second series extend in the opposite direction, from the other transverse face 32 of the internal ring to the vicinity of the transverse face 22, but without reaching it. The longitudinal slots are regularly spaced on the surface of the internal ring and are arranged so as to alternate a slot of the second series between two slots of the first series. This alternative embodiment of "head-to-tail" oriented slots makes it possible to obtain homogeneous expansion of the internal ring. This therefore makes it possible to obtain forces distributed uniformly over the walls of the tube and therefore to reduce the risk of cracking them.

According to the invention, the device of the invention is intended for aeronautical use and in particular for the production of dirigible or aircraft structures. It is particularly well-suited to the tubes used for this type of embodiment made of composite material mainly consisting of unidirectional fibers, oriented in the direction of the longitudinal axis of the tube. Indeed, these tubes have the particularity of having a low transverse strength of around 50 to 75 MPa.

However, the attachment device and the assembly method thereof could be adapted to other embodiments requiring solid and reliable attachment while guaranteeing a low impact on the mass of the structure on which it fits.

The invention claimed is:

1. An attachment device obtained by joining three components, at the end of a tube, comprising:

a conical insert in the form of a truncated cone, the diameter of which narrows in the direction of the end of said tube, the conical insert having a receiving element for receiving a gripping or attachment member;

an internal ring provided with a recess in the form of a truncated cone, the diameter of which narrows in the direction of the center of the tube and the angle of which is equal to or less than the angle of the truncated cone of the conical insert, the external wall of said internal ring being cylindrical with a diameter substantially equal to the internal diameter of the tube, said insert being located in the recess of said internal ring; and an external ring comprising a cylindrical portion, the internal diameter of which is substantially equal to the external diameter of said tube, the internal wall of said cylindrical portion of said external ring being intended to come into contact with the cylindrical external wall of the tube, said external ring comprising a shoulder which partially closes an end of said external ring and which has a circular opening, said shoulder comprising an annular internal face intended to abut the end face of the tube and against the transverse end face of the internal ring located on the side of the end of said tube, characterized in that the conical insert and the external ring are sized so that in their assembled position with the internal ring and the tube:

either a smallest-diameter transverse end face of the conical insert abuts the internal face of the external ring, the circular opening having a sufficient diameter to allow free access to the receiving element and less than the diameter of the smallest-diameter transverse end face, or the smallest-diameter transverse end face of the conical insert is in the same plane as the external face of the external ring.

2. The attachment device according to claim 1, wherein the three components are sized so that their assembly at the end of the tube renders the device integral to the tube and capable of withstanding a tensile load corresponding to the load required for the assembly referred to as a preload.

3. The attachment device according to claim 1, wherein the angle of the recess is up to 1 degree less than the angle of the truncated cone of the conical insert.

4. The device according to claim 1, wherein the internal ring comprises a slot or a plurality of slots equidistantly distributed around the circumference of said internal ring and extending longitudinally over a portion of the length of said internal ring.

5. The attachment device according to claim 4, wherein the slots extend from a transverse face of the internal ring located on the side of the end of the tube and corresponding to the first end of said internal ring, to the vicinity of the other transverse face of said internal ring located at the opposite end of the first, so that the portion of said internal ring not split by said slots, has a continuous internal annular surface in contact with the conical insert and a continuous external annular surface in contact with said tube, the continuity of the annular surfaces in contact ensuring the sealing of the attachment device.

6. The attachment device according to claim 4, wherein the internal ring comprises two series of longitudinal slots, each series comprising at least two slots, said slots of the first series extend from the transverse face of said internal ring located on the side of the end of said tube and corresponding to the first end of said internal ring to the vicinity of the other transverse face of said internal ring, located at the opposite end of the first, while said slots of the second series extend in the opposite direction, from the other transverse face of said internal ring to the vicinity of the transverse face, said longitudinal slots being arranged so as to alternate a slot of the second series between two slots of the first series.

7. The device according to claim 1, wherein the conical insert has an angle of less than 7 degrees.

8. The device according to claim 1, wherein the length of the cylindrical portion of the external ring is greater than the length of the internal ring so that the length of tube covered by the external ring is greater than the length of tube covered by the internal ring, by a length representing between 5% and 15% of the length of tube covered by the internal ring.

9. The non-deformable attachment device according to claim 1, wherein the smallest external diameter of the conical insert is greater than the smallest internal diameter of the internal ring by a few tenths of a millimeter.

10. The deformable attachment device according to claim 1, wherein the circular opening has a diameter greater than the diameter of the smaller diameter transverse face of the conical insert, so that the conical insert can move in the longitudinal direction toward the exterior of the tube if the device experiences a higher tensile load than that for which it has been sized, corresponding to the preload.

11. The attachment device according to claim 1, wherein the transverse thermal expansion coefficients of the three components are substantially equal.

12. A method for joining three components to the end of a tube to obtain the attachment device according to claim 1, comprising the steps of:

the conical insert is fitted into the recess of the internal ring so as to cause its smaller-diameter face to penetrate through the face of the internal ring corresponding to its end face where the recess is of greater diameter until the conical insert is immobilized by contact with the internal ring;

the internal ring provided with the conical insert is placed in the tube by being pushed inside until the end face of the internal ring is in the same plane as the end face of the tube, the external wall of the internal ring being cylindrical with a diameter substantially equal to the internal diameter of the tube or slightly smaller, the external cylindrical wall of the internal ring is then positioned in contact against the internal wall of the tube;

the external ring is placed around the tube so that the internal wall of its cylindrical portion is in contact with the external wall of the tube and so that the end surface of the tube abuts the annular planar face of the external ring; and a force is applied to the conical insert in order to move it in the direction of the end of the tube to its assembled position, the conical insert and the external ring being sized so that in their assembled position with the internal ring and the tube:

either a smallest-diameter transverse end face of the conical insert abuts the internal face of the external ring, the circular opening having a sufficient diameter to allow free access to the receiving element and less than the diameter of the transverse face, or the smallest-diameter transverse end face of the conical insert is in the same plane as the external face of the external ring;

the conical insert exerting, during its movement, a radial thrust on the wall of the internal ring causing its expansion, the necessary force applied corresponding to the preload of the attachment device (10, 100) will remain in place after assembly.

13. A lattice structure comprising an attachment device according to claim 1 for the construction of aircraft such as a dirigible, wherein the tube is one of the main tubes of the end of a lattice beam.

14. The lattice structure according to claim 13, characterized in that the attachment device comprises a flange attached to the external wall of the external ring in order to connect the device to the structure made of lattice beams.

* * * * *